United States Patent
Onuma (10) Patent No.: US 12,513,438 B2
(45) Date of Patent: *Dec. 30, 2025

(54) LIGHT SOURCE DEVICE, OPTICAL DEVICE, CONTROL LIGHT GENERATION METHOD, AND MONITORING LIGHT GENERATION METHOD

(71) Applicant: NEC Corporation, Tokyo (JP)

(72) Inventor: Taketo Onuma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 253 days.

This patent is subject to a terminal disclaimer.

(21) Appl. No.: 18/270,976

(22) PCT Filed: Jan. 12, 2021

(86) PCT No.: PCT/JP2021/000613
§ 371 (c)(1),
(2) Date: Jul. 5, 2023

(87) PCT Pub. No.: WO2022/153349
PCT Pub. Date: Jul. 21, 2022

(65) Prior Publication Data
US 2024/0064444 A1    Feb. 22, 2024

(51) Int. Cl.
H04Q 11/00    (2006.01)
G02F 1/31     (2006.01)
H01S 3/067    (2006.01)
H01S 3/16     (2006.01)
H04B 10/071   (2013.01)

(52) U.S. Cl.
CPC ........... *H04Q 11/0005* (2013.01); *G02F 1/31* (2013.01); *H04B 10/071* (2013.01);
(Continued)

(58) Field of Classification Search
CPC ........ H04Q 11/0005; H04Q 2011/0016; G02F 1/31; H04B 10/071; H04B 10/508;
(Continued)

(56) References Cited

U.S. PATENT DOCUMENTS

2009/0208212 A1    8/2009  Lee et al.
2010/0128348 A1*   5/2010  Taverner ............... G01J 3/4338
                                                    359/885
(Continued)

FOREIGN PATENT DOCUMENTS

CN    107749777 A  *  3/2018
JP    H08-234250 A     9/1996
(Continued)

OTHER PUBLICATIONS

International Search Report for PCT Application No. PCT/JP2021/000613, mailed on Mar. 23, 2021.
(Continued)

*Primary Examiner* — Hibret A Woldekidan
(74) *Attorney, Agent, or Firm* — Sughrue Mion, PLLC (57) ABSTRACT

Since it is difficult to constantly monitor a large number of unused fiber optic transmission lines in an optical submarine cable system, a light source device according to the present invention includes: a light generation unit for generating amplified spontaneous emission light; a light control unit for controlling the band and power of the amplified spontaneous emission light and generating waveform shaping spontaneous emission light; and an optical branching unit for branching the waveform shaping spontaneous emission light into a plurality of branched light beams.

10 Claims, 8 Drawing Sheets

(52) U.S. Cl.
CPC ......... *H01S 3/06708* (2013.01); *H01S 3/1608* (2013.01); *H01S 2301/02* (2013.01); *H04Q 2011/0016* (2013.01)

(58) Field of Classification Search
CPC .... H04B 10/25; H04B 10/564; H04B 10/572; H04B 10/50; H01S 3/06708; H01S 3/1608; H01S 2301/02; H01S 3/06795
See application file for complete search history.

(56) References Cited

U.S. PATENT DOCUMENTS

| | | | | |
|---|---|---|---|---|
| 2014/0139906 A1* | 5/2014 | Takeyama | ............. | H01S 3/1003 359/337.13 |
| 2019/0052356 A1* | 2/2019 | Inoue | ................ | H04J 14/02216 |
| 2021/0194616 A1* | 6/2021 | Yamamoto | .......... | H04J 14/0291 |

FOREIGN PATENT DOCUMENTS

| | | | | |
|---|---|---|---|---|
| JP | 2006-196938 A | | 7/2006 | |
| JP | 2015-021826 A | | 2/2015 | |
| JP | 2015-070358 A | | 4/2015 | |
| JP | 2016-063240 A | | 4/2016 | |
| JP | 2020-053852 A | | 4/2020 | |
| WO | WO-2017168994 A1 * | 10/2017 | ........... | H04B 10/032 |
| WO | 2019/151067 A1 | | 8/2019 | |

OTHER PUBLICATIONS

English translation of Written opinion for PCT Application No. PCT/JP2021/000613, mailed on Mar. 23, 2021.

* cited by examiner

LIGHT SOURCE DEVICE, OPTICAL DEVICE, CONTROL LIGHT GENERATION METHOD, AND MONITORING LIGHT GENERATION METHOD

This application is a National Stage Entry of PCT/JP2021/000613 filed on Jan. 12, 2021, the contents of all of which are incorporated herein by reference, in their entirety.

TECHNICAL FIELD

The present invention relates to a light source device, an optical device, a control light generation method, and a monitoring light generation method, more particularly to a light source device, an optical device, a control light generation method, and a monitoring light generation method that are used in an optical submarine cable system.

BACKGROUND ART

An optical submarine cable system in which continents are connected to one another via optical fibers is a key factor as an infrastructure that supports an international communication network. The optical submarine cable system includes a submarine cable that accommodates optical fibers, a submarine repeater that includes an optical amplifier, a submarine splitting device that splits an optical signal, a terminal device that is installed in a land station, and the like.

In the optical submarine cable system, a submarine transmission-path monitor device (remote fiber test equipment: RFTE) monitors that there is no abnormality in an optical fiber being not used (dark fiber). When an optical time domain reflectometry (OTDR) method is adopted, the submarine transmission-path monitor device (RFTE) sends a light pulse out from one end of an optical fiber, and measures a change in intensity of a back-scattering light that returns through the optical fiber in a direction opposite to a direction in which the light pulse is sent out. In this case, when only the light pulse is sent out, power is instantly changed from a non-input state at the submarine repeater, and hence an optical surge is generated. PTL 1 describes one example of a technique for avoiding generation of such an optical surge.

A related optical network system described in PTL 1 includes a plurality of light signal distribution devices, a plurality of light beam paths that connect the plurality of light signal distribution devices to one another, and a network management server. Each of the light signal distribution devices includes an optical cross-connect device. A WDM multiplexing device that multiplexes signal lights having wavelengths different from one another and generates a WDM signal light, a WDM dividing device that divides the WDM signal light into individual signal lights according to wavelengths, a beam path measuring device, and a dummy light source are connected to the optical cross-connect device. Herein, the network management server controls the optical cross-connect device of the light signal distribution device to output an output dummy light from the dummy light source to an optical amplification beam path in which a signal light is not transmitted.

With this configuration, it is assumed that, according to the related optical network system, the dummy light is supplied to a light beam path being not used, thereby generation of an optical surge is suppressed at a time of setting an optical path.

Further, examples of the related art include a technique described in PTL 2.

CITATION LIST

Patent Literature

PTL 1: Japanese Unexamined Patent Application Publication No. 2006-196938
PTL 2: International Patent Publication WO2019/151067

SUMMARY OF INVENTION

Technical Problem

As described above, the related optical network system described in PTL 1 has a configuration in which the optical cross-connect device is controlled to switch an output destination of the dummy light. Thus, the plurality of optical fiber transmission paths cannot simultaneously be remained in a state of enabling introduction of a light pulse therein. Further, when there are a large number of optical fiber transmission paths to be monitored, a long time period is required for monitoring all the optical fiber transmission paths.

Thus, there is a problem of difficulty in constantly monitoring a large number of unused optical fiber transmission paths in an optical submarine cable system.

An object of the present invention is to provide a light source device, an optical device, a control light generation method, and a monitoring light generation method that solve a problem of difficulty in constantly monitoring a large number of unused optical fiber transmission paths in an optical submarine cable system.

Solution to Problem

A light source device according to the present invention includes a light generation means for generating an amplified spontaneous emission light, a light control means for controlling a band and power of the amplified spontaneous emission light and generating a waveform-shaped spontaneous emission light, and a light splitting means for splitting the waveform-shaped spontaneous emission light into a plurality of split lights.

A control light generation method according to the present invention includes generating an amplified spontaneous emission light, controlling a band and power of the amplified spontaneous emission light and generating a waveform-shaped spontaneous emission light, and splitting the waveform-shaped spontaneous emission light into a plurality of split lights.

Advantageous Effects of Invention

According to the light source device, the optical device, the control light generation method, and the monitoring light generation method of the present invention, it is possible to constantly monitor a large number of unused optical fiber transmission paths in an optical submarine cable system.

EXAMPLE EMBODIMENT

With reference to the drawings, example embodiments of the present invention are described below.

First Example Embodiment

Figure 1:
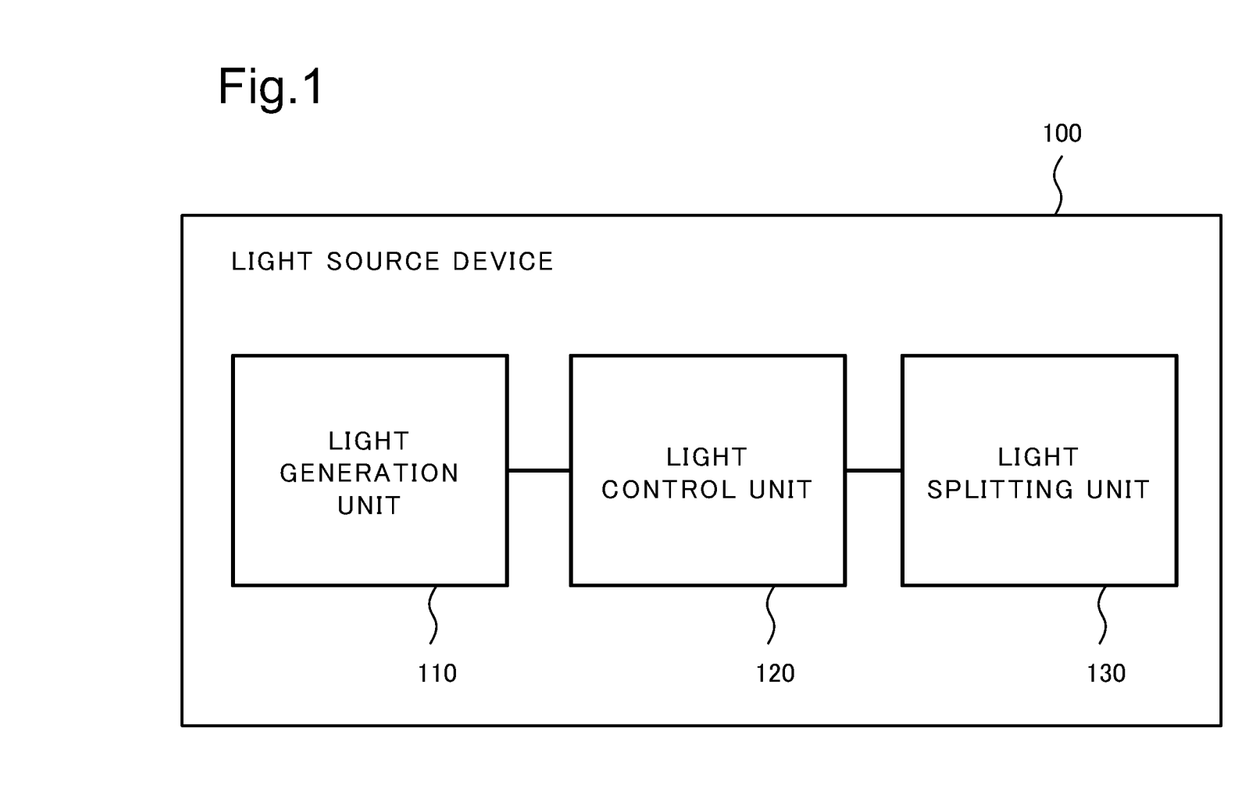
FIG. 1 is a block diagram illustrating a configuration of a light source device according to a first example embodiment of the present invention.

FIG. 1 is a block diagram illustrating a configuration of a light source device 100 according to a first example embodiment of the present invention. The light source device 100 includes a light generation unit (light generation means) 110, a light control unit (light control means) 120, and a light splitting unit (light splitting means) 130. The light source device 100 is suitably used in an optical submarine cable system.

The light generation unit 110 generates an amplified spontaneous emission light. The light control unit 120 controls a band and power of the amplified spontaneous emission light to generate a waveform-shaped spontaneous emission light. Further, the light splitting unit 130 splits the waveform-shaped spontaneous emission light into a plurality of split lights.

As described above, the light source device 100 of the present example embodiment includes a configuration in which the light splitting unit 130 splits the waveform-shaped spontaneous emission light that is generated by the light generation unit 110 and the light control unit 120, into the plurality of split lights. Thus, the plurality of split lights can be supplied as dummy lights spontaneously to a large number of unused optical fiber transmission paths. As a result, the plurality of optical fiber transmission paths can spontaneously be remained in a state that enables introduction of a light pulse therein, and hence an unused optical fiber (dark fiber) can be monitored without generating an optical surge. In other words, according to the light source device 100 of the present example embodiment, it is possible to constantly monitor a large number of unused optical fiber transmission paths in an optical submarine cable system.

Herein, the light generation unit 110 may be configured to include a light waveguide having a core containing a rare earth element, and an excitation laser that generates an excitation light for exciting the rare earth element. Specifically, for example, as the light generation unit 110, there may be used an amplified spontaneous emission (ASE) light source in which an amplifier using an erbium doped fiber as a light waveguide (Erbium Doped Fiber Amplifier: EDFA) is in a non-input signal state. The amplified spontaneous emission (ASE) light generated by the light generation unit 110 is an amplified spontaneous emission light having a continuous and broad light spectrum.

The light control unit 120 may be configured to include a wavelength selective switch (WSS). The wavelength selective switch (WSS) is capable of adjusting an attenuation amount of power of an input light for each wavelength. The wavelength selective switch (WSS) has a one-input/one-output configuration, and thus an output light can be acquired by shaping a waveform of an input light in a freely selective manner.

The light control unit 120 is capable of controlling a band of the amplified spontaneous emission light to fall within a range including all the wavelength bands of the wavelength multiplex signal lights propagated through the optical submarine cable system. Further, the light control unit 120 may be configured to control power of the amplified spontaneous emission light in such a way that power of each split light after splitting performed by the light splitting unit 130 matches with total input power at a submarine repeater constituting the optical submarine cable system. The light control unit 120 may output the amplified spontaneous emission light without limiting its power.

Typically, a light splitter of a multi-splitting type may be used as the light splitting unit 130.

Next, a control light generation method according to the present example embodiment is described.

In the control light generation method according to the present example embodiment, first, an amplified spontaneous emission light is generated. Subsequently, the band and the power of the amplified spontaneous emission light are controlled to generate a waveform-shaped spontaneous emission light. After that, the waveform-shaped spontaneous emission light is split into a plurality of split lights.

Herein, generating the amplified spontaneous emission light described above may include exciting the rare earth element contained in the core of the light waveguide with an excitation light. Further, there may be adopted a configuration in which generating the waveform-shaped spontaneous emission light described above includes adjusting the power of the amplified spontaneous emission light for each wavelength.

As described above, according to the light source device 100 and the control light generation method of the present example embodiment, it is possible to constantly monitor a large number of unused optical fiber transmission paths in an optical submarine cable system.

Second Example Embodiment

Figure 2:
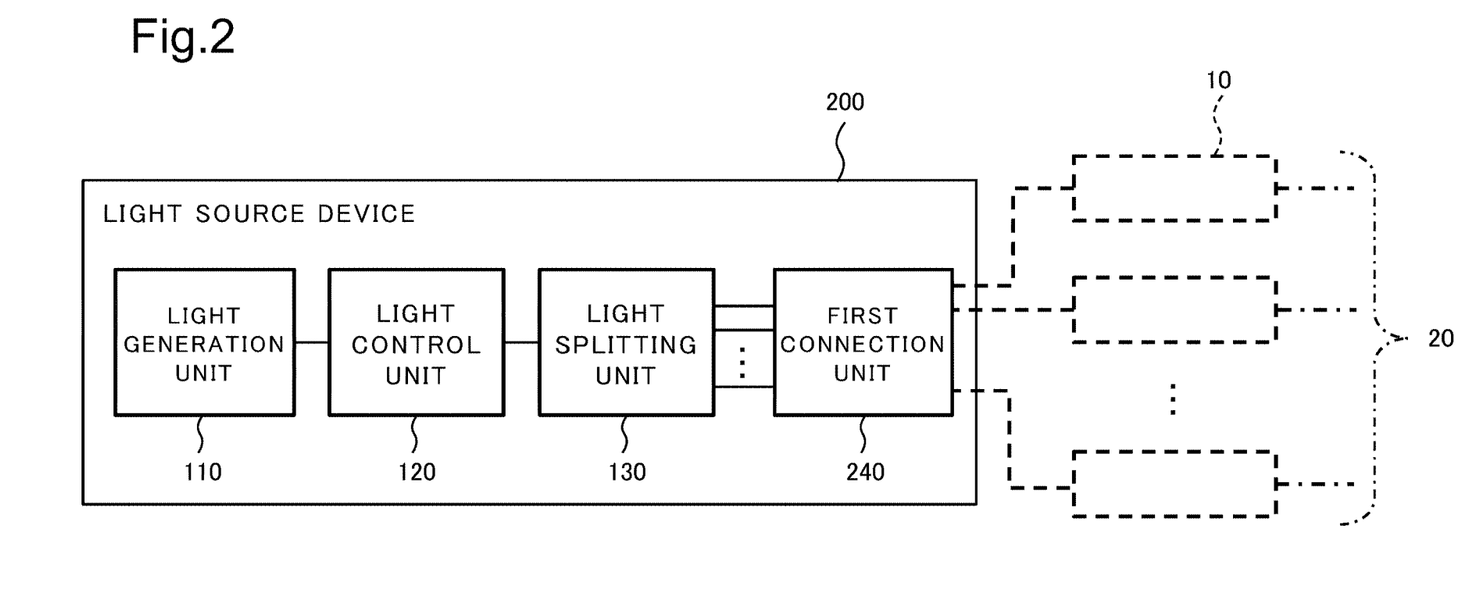
FIG. 2 is a block diagram illustrating a configuration of a light source device according to a second example embodiment of the present invention.

Next, a second example embodiment of the present invention is described. FIG. 2 illustrates a configuration of a light source device 200 according to the present example embodiment. The light source device further includes a first connection unit (first connection means) 240, in addition to a light generation unit (light generation means) 110, a light control unit (light control means) 120, and a light splitting unit (light splitting means) 130. The light source device 200 is suitably used in an optical submarine cable system.

The light generation unit 110 generates an amplified spontaneous emission light. The light control unit 120 controls a band and power of the amplified spontaneous emission light to generate a waveform-shaped spontaneous emission light. The light splitting unit 130 splits the waveform-shaped spontaneous emission light into a plurality of split lights. The first connection unit 240 is configured to introduce the plurality of split lights into a plurality of interface devices 10 provided to a plurality of light transmission paths 20. Typically, as the first connection unit 240, an optical adapter that connects optical fibers through which a split light is propagated may be used.

Each of the plurality of light transmission paths 20 includes optical fiber transmission paths, and each of the optical fiber transmission paths forms a fiber pair (FP) including an up-link optical fiber and a down-link optical fiber. Herein, each of the fiber pairs (FP) is an unused optical fiber (dark fiber) through which a main signal light is not propagated. In other words, there is established a state in which a transponder being a main signal source is not connected to each of the interface devices 10.

The light control unit 120 may be configured to control the band and the power of the amplified spontaneous emission light, according to the number of the plurality of interface devices 10. Specifically, when the number of the interface devices 10 connected to a large number of fiber pairs (for example, eight or more fiber pairs) is large (for example, eight or more), the light control unit 120 may be configured to output the amplified spontaneous emission light without limiting its power.

Next, a control light generation method according to the present example embodiment is described.

In the control light generation method according to the present example embodiment, first, an amplified spontaneous emission light is generated. Subsequently, the band and the power of the amplified spontaneous emission light are controlled to generate a waveform-shaped spontaneous emission light. After that, the waveform-shaped spontaneous emission light is split into a plurality of split lights. The configuration described above is similar to the control light generation method according to the first example embodiment.

Further, in the control light generation method according to the present example embodiment, the plurality of split lights are introduced into the plurality of interface devices provided to the plurality of light transmission paths. In this case, there may be adopted a configuration in which, when the waveform-shaped spontaneous emission light is generated, the band and the power of the amplified spontaneous emission light are controlled according to the number of the plurality of interface devices.

As described above, according to the light source device 200 and the control light generation method of the present example embodiment, it is possible to constantly monitor a large number of unused optical fiber transmission paths in an optical submarine cable system.

Third Example Embodiment

Figure 3:
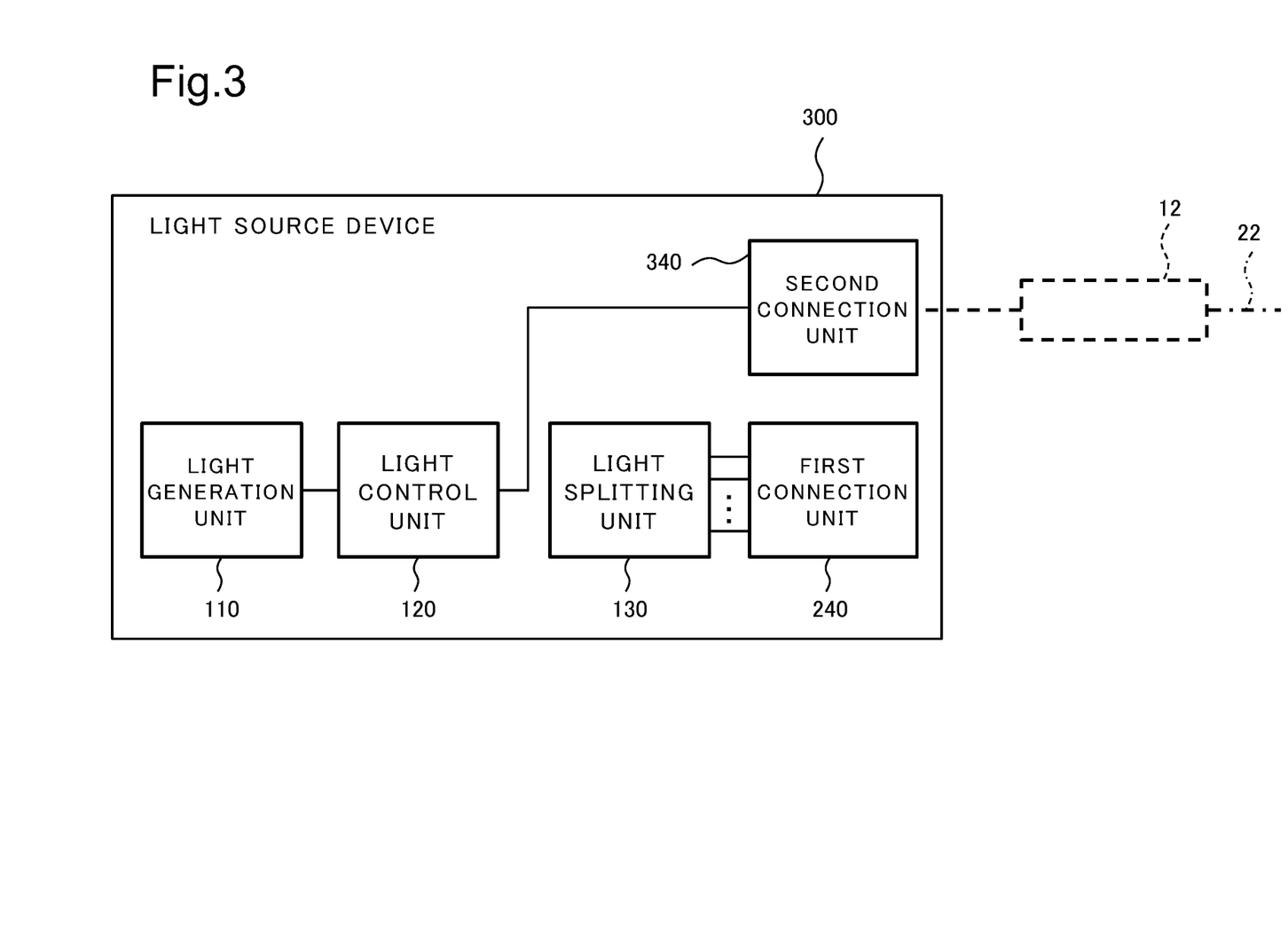
FIG. 3 is a block diagram illustrating a configuration of a light source device according to a third example embodiment of the present invention.

Next, a third example embodiment of the present invention is described. FIG. 3 illustrates a configuration of a light source device 300 according to the present example embodiment. The light source device further includes a second connection unit (second connection means) 340, in addition to a light generation unit (light generation means) 110, a light control unit (light control means) 120, a light splitting unit (light splitting means) 130, and a first connection unit (first connection means) 240. The light source device 300 is suitably used in an optical submarine cable system. The configurations similar to those of the light source device 200 according to the second example embodiment are denoted with the identical reference symbols, and detailed description therefor is omitted in some cases.

The light generation unit 110 generates an amplified spontaneous emission light. The light control unit 120 controls a band and power of the amplified spontaneous emission light to generate a waveform-shaped spontaneous emission light.

The second connection unit 340 is configured to introduce the waveform-shaped spontaneous emission light into an operation interface device 12 included in the plurality of interface devices. Typically, as the second connection unit 340, an optical adapter that connects optical fibers through which the waveform-shaped spontaneous emission light is propagated may be used.

Herein, the operation interface device 12 is associated with an operation light transmission path 22 through which a main signal light is propagated, among the plurality of light transmission paths. In other words, there is established a state in which the transponder being a main signal source is connected to the operation interface device 12.

In this case, the light control unit 120 may be configured to control the band and the power of the amplified spontaneous emission light, according to a characteristic of the operation light transmission path 22. Specific description is given below with reference to the drawings.

Figure 4A:
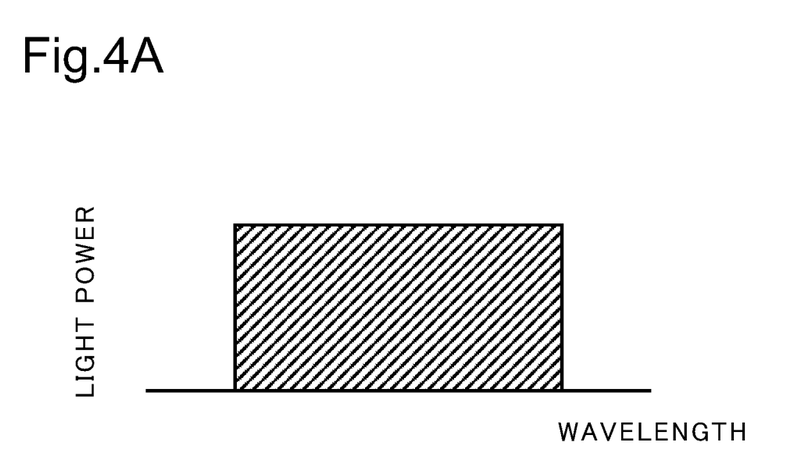
FIG. 4A is a diagram illustrating a spectrum of a waveform-shaped spontaneous emission light that is generated by a light control unit included in the light source device according to the second example embodiment of the present invention.

FIG. 4A illustrates a spectrum of the waveform-shaped spontaneous emission light generated by the light control unit 120 included in the light source device 200 according to the second example embodiment. In this case, after splitting performed by the light splitting unit 130, the waveform-shaped spontaneous emission light is introduced into each unused optical fiber (dark fiber) through which a main signal light is not propagated. For monitoring an unused optical fiber (dark fiber), it is only required to introduce a split light as a dummy light to establish a state that enables introduction of a light pulse therein. Therefore, as illustrated in FIG. 4A, the light control unit 120 continuously outputs the waveform-shaped spontaneous emission light with full power, without limiting the power of the amplified spontaneous emission light. As a result, each of the plurality of split lights after splitting performed by the light splitting unit can have required power.

Figure 4B:
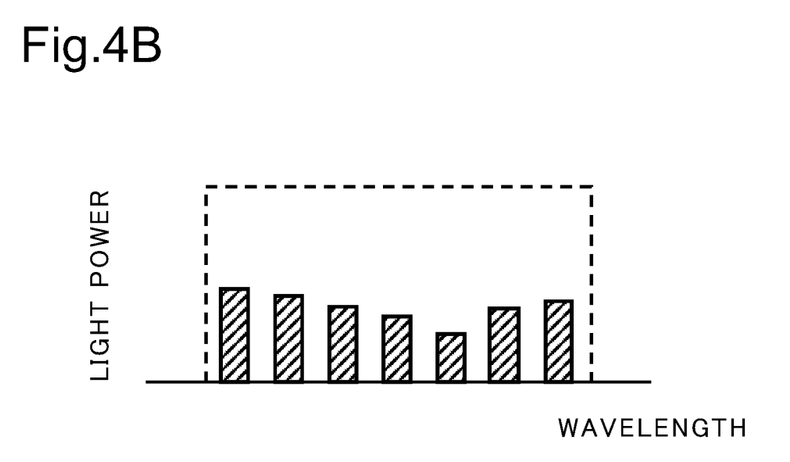
FIG. 4B is a diagram illustrating a spectrum of a waveform-shaped spontaneous emission light that is generated by a light control unit included in the light source device according to the third example embodiment of the present invention.

Meanwhile, when the waveform-shaped spontaneous emission light is introduced as a dummy light into the operation light transmission path through which a main signal light is propagated, it is required to compensate wavelength dependency of a loss and a gain in the optical fiber transmission path constituting the operation light transmission path or in an optical amplifier included in a submarine repeater. In view of this, in the light source device 300 according to the present example embodiment, as illustrated in FIG. 4B, the light control unit 120 is configured to control the band and the power of the amplified spontaneous emission light, according to a characteristic of the operation light transmission path 22. Specifically, for example, the light control unit 120 controls the band of the amplified spontaneous emission light to one of an odd-numbered channel and an even-numbered channel in a wavelength division multiplexing (WDM) method, and shapes a comblike waveform. Further, the power of the amplified spontaneous emission light generated by the light generation unit 110 (the broken line in FIG. 4B) is controlled to be approximately a half, and thus a height of the power level can be controlled. By using the waveform-shaped spontaneous emission light thus shaped, adjustment can be performed in such a way that a ratio of a light signal to a noise (Optical Signal to Noise Ratio: OSNR) on the reception side is constant at each channel.

Next, description is made on a case in which an operation is changed from a state in which the transponder being a main signal source is not connected to each of the interface devices 10 to a state in which the transponder is connected to the operation interface device 12.

Figure 5:
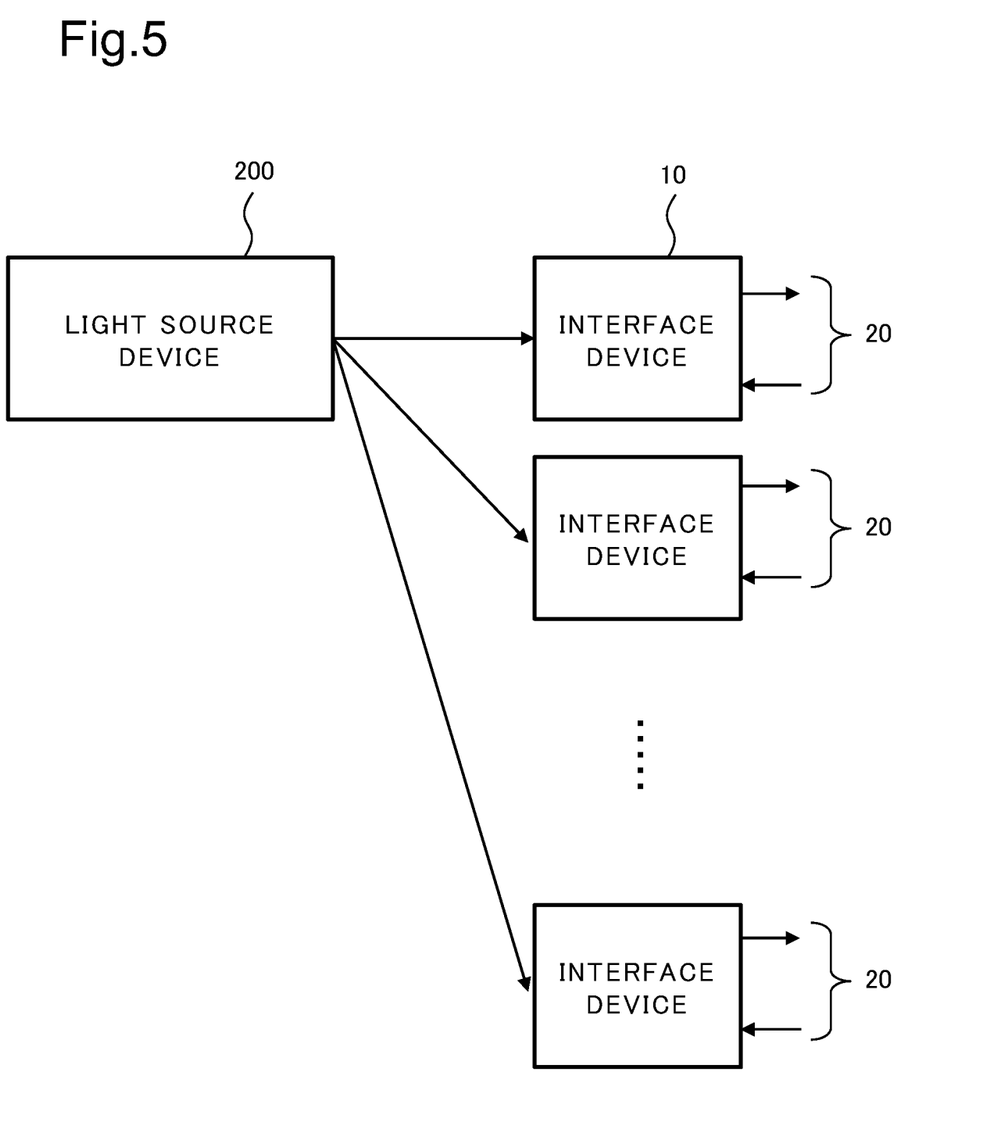
FIG. 5 is a block diagram illustrating a connection relationship between the light source device and interface devices according to the second example embodiment of the present invention.

First, in a state in which the transponder being a main signal source is not connected to each of the interface devices 10, as illustrated in FIG. 5, the light source device 200 according to the second example embodiment supplies a split light as a dummy light to each of the plurality of light transmission paths 20 via the interface devices 10. Herein, each of the light transmission paths 20 is an unused optical fiber (dark fiber) through which a main signal light is not propagated, and is a fiber pair (FP) including an up-link optical fiber and a down-link optical fiber, for example. With this configuration, a large number of unused optical fiber transmission paths can constantly be monitored.

Figure 6A:
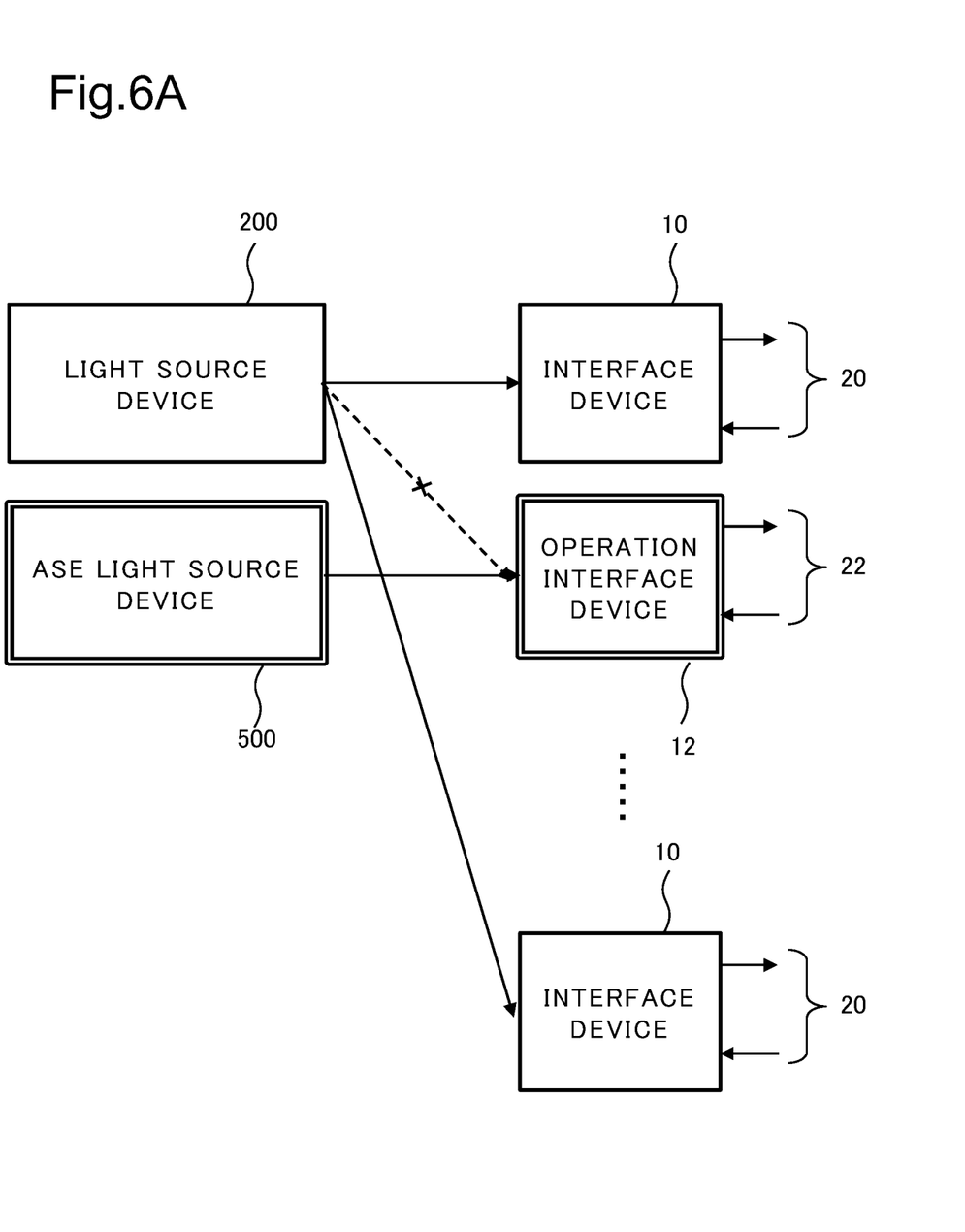
FIG. 6A is a block diagram illustrating another connection relationship between the light source device and the interface devices according to the second example embodiment of the present invention.

After that, as illustrated in FIG. 6A, when an operation is changed to a configuration in which the transponder is connected to the operation interface device 12 among the interface devices, and a main signal light is propagated through the operation light transmission path 22, connection between the light source device 200 and the operation interface device 12 is cancelled. Subsequently, an ASE light source device 500 including the light generation unit 110 and the light control unit 120 is connected to the operation interface device 12. In this state, as the ASE light source device 500, the light source device 300 according to the present example embodiment may be used. With this configuration, the light source device can be used to monitor an unused optical fiber transmission path, and the ASE light source device 500 or the light source device 300 can be used to compensate wavelength dependency of a loss and a gain in the operation light transmission path 22.

Figure 6B:
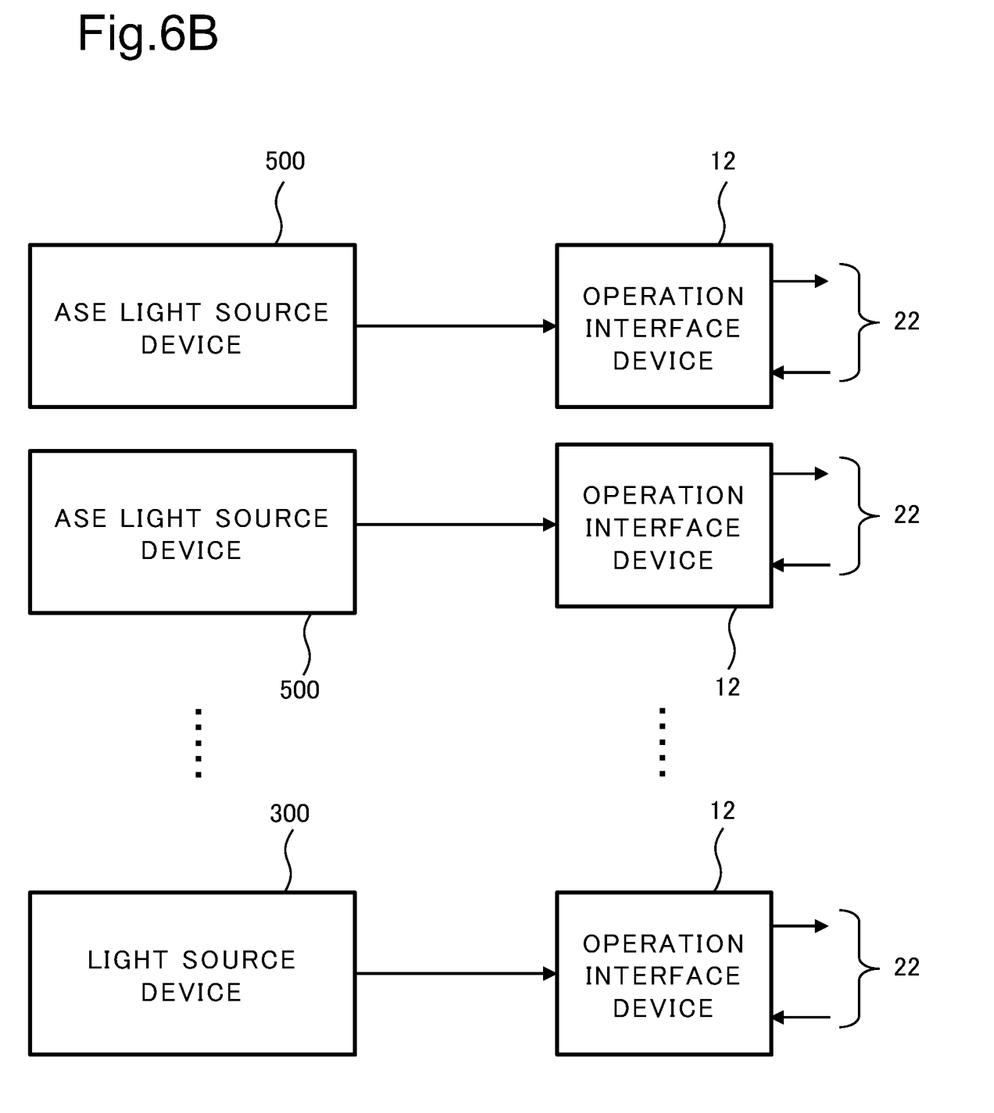
FIG. 6B is a block diagram illustrating a connection relationship between the light source device and interface devices according to the third example embodiment of the present invention.

After that, as illustrated in FIG. 6B, the operation interface device that is lastly connected to the transponder after connecting the transponder to each of the plurality of interface devices can be configured to be connected to device 300 according to the present example embodiment. The light source device 300 may be configured by changing connection between the light control unit 120 and the light splitting unit in the light source device 200 according to the second example embodiment to connection between the light control unit 120 and the second connection unit 340 (see FIGS. 2 and 3). Therefore, as the light source device 300, the light source device 200 used for monitoring an unused optical fiber (dark fiber) can be used again.

Next, a control light generation method according to the present example embodiment is described.

In the control light generation method according to the present example embodiment, first, an amplified spontaneous emission light is generated. Subsequently, the band and the power of the amplified spontaneous emission light are controlled to generate a waveform-shaped spontaneous emission light. After that, the waveform-shaped spontaneous emission light is split into a plurality of split lights.

Further, in the control light generation method according to the present example embodiment, the waveform-shaped spontaneous emission light is supplied to the operation interface device included in the plurality of interface devices provided to the plurality of light transmission paths. Herein, the operation interface device is associated with the operation light transmission path through which a main signal light is propagated, among the plurality of light transmission paths. Further, there may be adopted a configuration in which, when the waveform-shaped spontaneous emission light is generated, the band and the power of the amplified spontaneous emission light are controlled according to a characteristic of the operation light transmission path.

As described above, according to the light source device 300 and the control light generation method of the present example embodiment, wavelength dependency of a loss and a gain in the operation light transmission path can be compensated.

Fourth Example Embodiment

Figure 7:
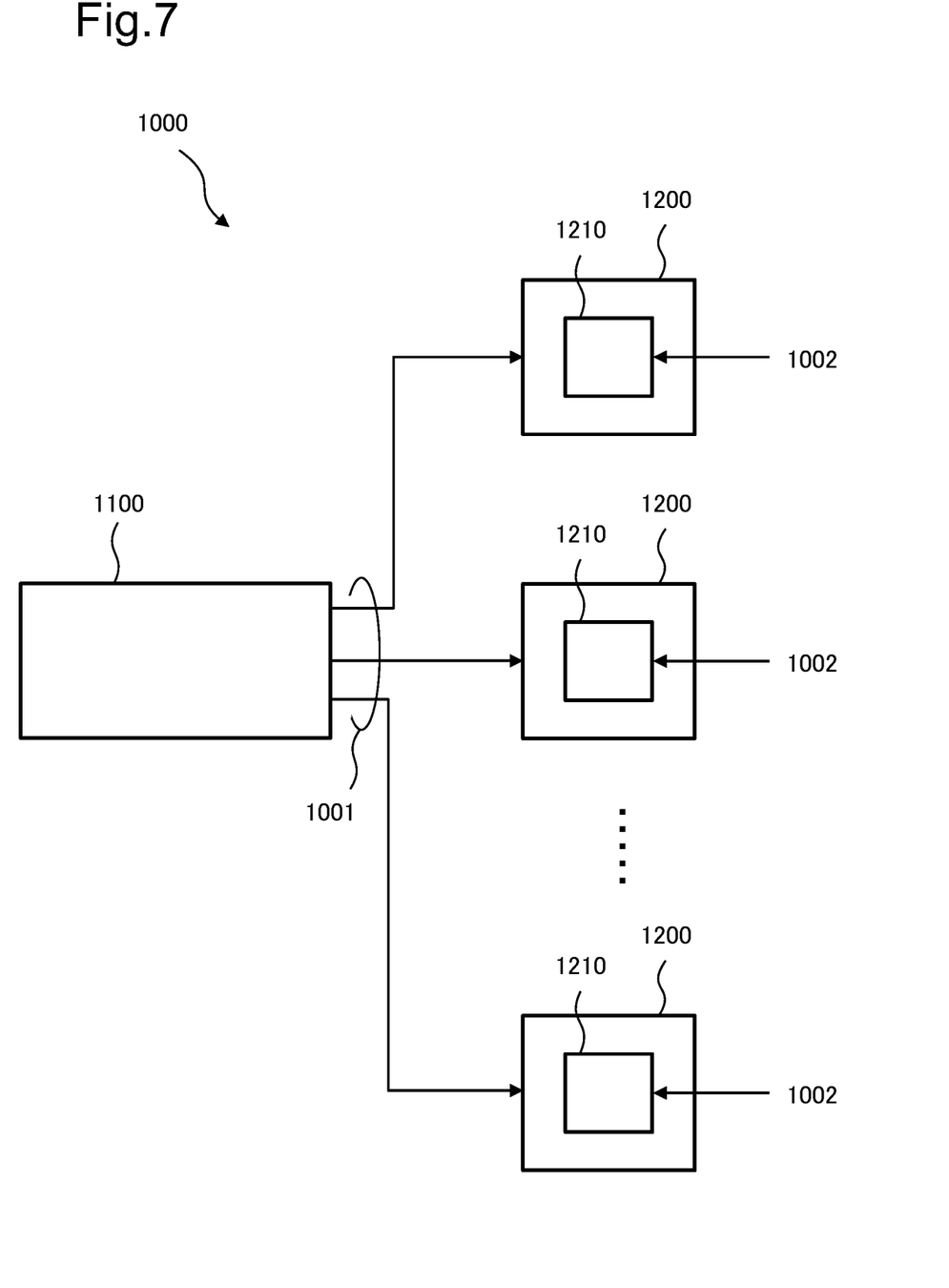
FIG. 7 is a block diagram illustrating a configuration of an optical device according to a fourth example embodiment of the present invention.

Next, a fourth example embodiment of the present invention is described. FIG. 7 illustrates a configuration of an optical device 1000 according to the present example embodiment. The optical device 1000 includes a light source device 1100 and a plurality of interface devices 1200. The optical device 1000 is suitably used in an optical submarine cable system.

As the light source device 1100, any one of the light source device according to the first example embodiment, the light source device 200 according to the second example embodiment, and the light source device according to the third example embodiment may be used. Therefore, the light source device 1100 is capable of generating a plurality of split lights 1001. Each of the plurality of split lights 1001 may be used as a dummy light for monitoring an unused optical fiber (dark fiber).

Each of the plurality of interface devices 1200 includes a light multiplexing unit (light multiplexing means) 1210 that multiplexes one of the plurality of split lights 1001 and a monitoring light signal 1002. For example, the monitoring light signal 1002 may be a light pulse used in an optical time domain reflectometry (OTDR) method.

Next, a monitoring light generation method according to the present example embodiment is described.

In the monitoring light generation method according to the present example embodiment, first, a plurality of split lights are generated. Then, one of the plurality of split lights and a monitoring light signal is multiplexed. Herein, at the time of generating the plurality of split lights, the control light generation method being any one of the control light generation methods according to the first example embodiment to the third example embodiment may be used.

With the configuration described above, according to the optical device 1000 and the monitoring light generation method of the present example embodiment, it is possible to constantly monitor a large number of unused optical fiber transmission paths in an optical submarine cable system.

Note that, a part or the entirety of the example embodiments described above may be described as in the following supplementary notes, but is not limited to the following.

(Supplementary Note 1) A light source device including a light generation means for generating an amplified spontaneous emission light, a light control means for controlling a band and power of the amplified spontaneous emission light and generating a waveform-shaped spontaneous emission light, and a light splitting means for splitting the waveform-shaped spontaneous emission light into a plurality of split lights.

(Supplementary Note 2) The light source device according to Supplementary Note 1, further including a first connection means for introducing each of the plurality of split lights into a plurality of interface devices provided to each of a plurality of light transmission paths.

(Supplementary Note 3) The light source device according to Supplementary Note 2, wherein the light control means controls a band and power of the amplified spontaneous emission light, according to the number of the plurality of interface devices.

(Supplementary Note 4) The light source device according to Supplementary Note 2, further including a second connection means for introducing the waveform-shaped spontaneous emission light into an operation interface device included in the plurality of interface devices, wherein the operation interface device is associated with an operation light transmission path through which a main signal light is propagated, among the plurality of light transmission paths.

(Supplementary Note 5) The light source device according to Supplementary Note 4, wherein the light control means controls a band and power of the amplified spontaneous emission light, according to a characteristic of the operation light transmission path.

(Supplementary Note 6) The light source device according to any one of Supplementary Notes 1 to 5, wherein the light generation means includes a light waveguide having a core containing a rare earth element, and an excitation laser that generates an excitation light for exciting the rare earth element.

(Supplementary Note 7) The light source device according to any one of Supplementary Notes 1 to 6, wherein the light control means includes a wavelength selective switch.

(Supplementary Note 8) An optical device including the light source device according to any one of Supplementary Notes 2 to 5, and the plurality of interface devices, wherein each of the plurality of interface devices includes a light multiplexing means for multiplexing one of the plurality of split lights and a monitoring light signal.

(Supplementary Note 9) A control light generation method including generating an amplified spontaneous emission light, controlling a band and power of the amplified spontaneous emission light and generating a waveform-shaped spontaneous emission light, and splitting the waveform-shaped spontaneous emission light into a plurality of split lights.

(Supplementary Note 10) The control light generation method according to Supplementary Note 9, further including introducing each of the plurality of split lights into a plurality of interface devices provided to each of a plurality of light transmission paths.

(Supplementary Note 11) The control light generation method according to Supplementary Note 10, wherein the generating the waveform-shaped spontaneous emission light includes controlling a band and power of the amplified spontaneous emission light, according to the number of the plurality of interface devices.

(Supplementary Note 12) The control light generation method according to Supplementary Note 9, further including supplying the waveform-shaped spontaneous emission light to an operation interface device included in a plurality of interface devices provided to each of a plurality of light transmission paths, wherein the operation interface device is associated with an operation light transmission path through which a main signal light is propagated, among the plurality of light transmission paths.

(Supplementary Note 13) The control light generation method according to Supplementary Note 12, wherein the generating the waveform-shaped spontaneous emission light includes controlling a band and power of the amplified spontaneous emission light, according to a characteristic of the operation light transmission path.

(Supplementary Note 14) The control light generation methods according to any one of Supplementary Notes 9 to 13, wherein the generating the amplified spontaneous emission light includes exciting a rare earth element contained in a core of a light waveguide with an excitation light.

(Supplementary Note 15) The control light generation method according to any one of Supplementary Notes 9 to 14, wherein the generating the waveform-shaped spontaneous emission light includes adjusting power of the amplified spontaneous emission light for each wavelength.

(Supplementary Note 16) A monitoring light generation method including generating the plurality of split lights by the control light generation method according to any one of Supplementary Notes 9 to 15, and multiplexing one of the plurality of split lights and a monitoring light signal.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 100, 200, 300 Light source device
110 Light generation unit
120 Light control unit
130 Light splitting unit
240 First connection unit
340 Second connection unit
500 ASE light source device
10 Interface device
12 Operation interface device
20 Light transmission path
22 Operation light transmission path
1000 Optical device
1001 Split light
1002 Monitoring light signal
1100 Light source device
1200 Interface device
1210 Light multiplexing unit

What is claimed is:

1. A light source device comprising:
a light generation circuit configured to generate an amplified spontaneous emission light;
a light control circuit configured to control a band and power of the amplified spontaneous emission light and generate a waveform-shaped spontaneous emission light; and
a light circuit configured to split the waveform-shaped spontaneous emission light into a plurality of split lights; and
a first connection circuit configured to introduce each of the plurality of split lights into a plurality of interface devices provided to each of a plurality of light transmission paths,
wherein the light control circuit controls a band and power of the amplified spontaneous emission light, according to a number of the plurality of interface devices.

2. The light source device according to claim 1, wherein the light generation circuit includes a light waveguide having a core containing a rare earth element, and an excitation laser that generates an excitation light for exciting the rare earth element.

3. The light source device according to claim 1, wherein the light control circuit includes a wavelength selective switch.

4. An optical device comprising:
the light source device according to claim 1; and
the plurality of interface devices,
wherein each of the plurality of interface devices includes a light multiplexing circuit configured to multiplex one of the plurality of split lights and a monitoring light signal.

5. A light source device comprising:
a light generation circuit configured to generate an amplified spontaneous emission light;
a light control circuit configured to control a band and power of the amplified spontaneous emission light and generate a waveform-shaped spontaneous emission light;
a light splitting circuit configured to split the waveform-shaped spontaneous emission light into a plurality of split lights;
a first connection circuit configured to introduce each of the plurality of split lights into a plurality of interface devices provided to each of a plurality of light transmission paths; and
a second connection circuit configured to introduce the waveform-shaped spontaneous emission light into an operation interface device included in the plurality of interface devices,
wherein the operation interface device is associated with an operation light transmission path through which a main signal light is propagated, among the plurality of light transmission paths.

6. The light source device according to claim 5, wherein the light control circuit controls a band and power of the amplified spontaneous emission light, according to a characteristic of the operation light transmission path.

7. A control light generation method comprising:
generating an amplified spontaneous emission light;
controlling a band and power of the amplified spontaneous emission light and generating a waveform-shaped spontaneous emission light;
splitting the waveform-shaped spontaneous emission light into a plurality of split lights; and
introducing each of the plurality of split lights into a plurality of interface devices provided to each of a plurality of light transmission paths,
wherein the generating the waveform-shaped spontaneous emission light includes controlling a band and power of the amplified spontaneous emission light, according to a number of the plurality of interface devices.

8. The control light generation method according to claim 7, wherein the generating the amplified spontaneous emission light includes exciting a rare earth element contained in a core of a light waveguide with an excitation light.

9. The control light generation method according to claim 7, wherein the generating the waveform-shaped spontaneous emission light includes adjusting power of the amplified spontaneous emission light for each wavelength.

10. A generation method comprising:
generating the plurality of split lights by the control light generation method according to claim 7; and
multiplexing one of the plurality of split lights and a monitor light signal.

* * * * *